Dec. 18, 1962 C. F. WINN 3,068,595
DITCH DIGGING AND FILLING IMPLEMENT
Filed May 29, 1958 2 Sheets-Sheet 1

Charles F. Winn
INVENTOR.

BY *Thomas A. O'Brien*
and *Harvey B. Jackson*
Attorneys

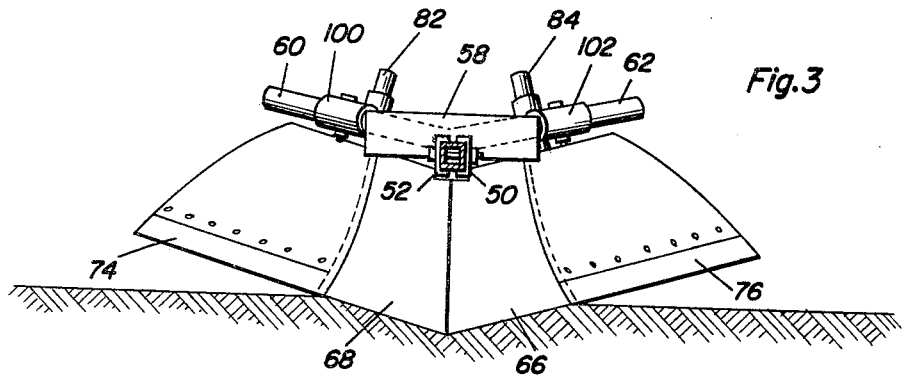
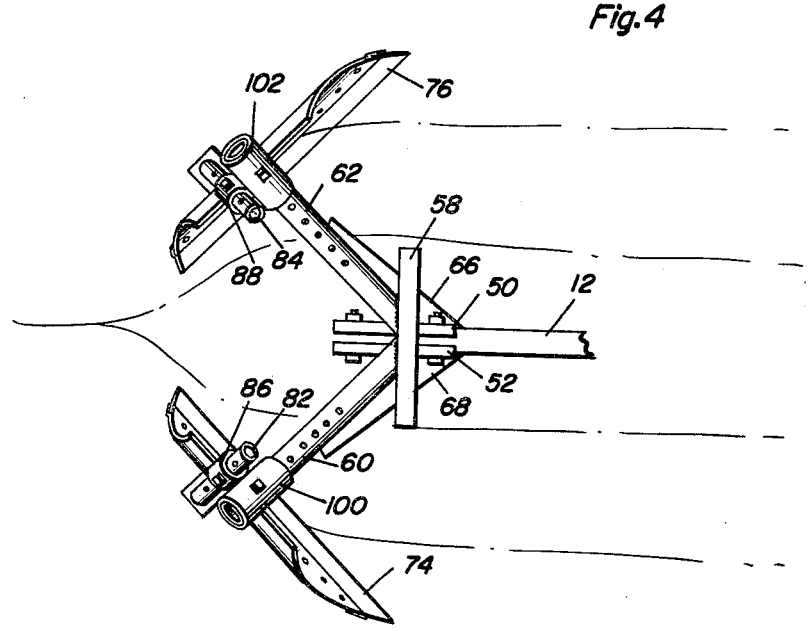
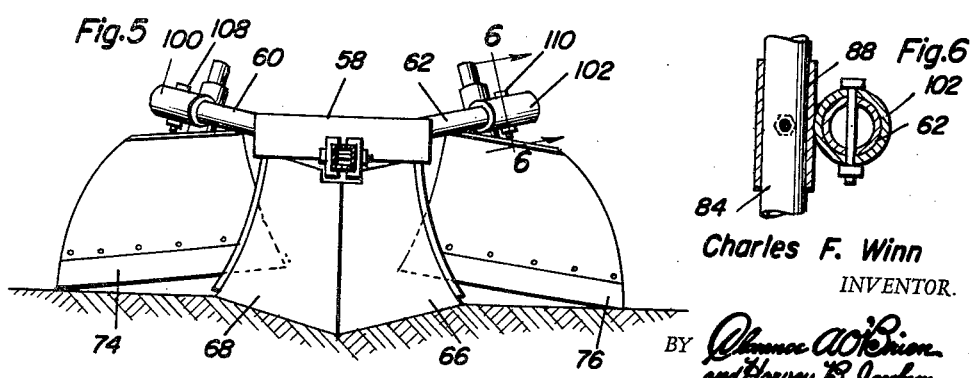
Charles F. Winn
INVENTOR.

United States Patent Office 3,068,595
Patented Dec. 18, 1962

3,068,595
DITCH DIGGING AND FILLING IMPLEMENT
Charles F. Winn, North Sedan Route, Dalhart, Tex.
Filed May 29, 1958, Ser. No. 738,671
5 Claims. (Cl. 37—98)

This invention relates generally to an agricultural implement and more particularly to a device capable of digging and filling ditches.

The need for digging ditches often arises on the farm to overcome problems such as drainage. Often, it is desirable to relocate a drainage ditch and so a device for digging and filling a ditch would prove invaluable for many farm operations. It is therefore the principal object of this invention to provide a novel and improved implement which is selectively capable of digging or filling a ditch.

It is a further object of this invention to provide a novel and improved ditch digging and filling implement which is adapted to be operatively pulled by a conventional tractor.

It is a still further object of this invention to provide a novel and improved ditch digging and filling implement which is capable of being easily converted for its respective uses.

It is a still further object of this invention to provide a novel and improved ditch digging and filling implement which is relatively simple in construction, reliable, and relatively inexpensive for the intended function.

In accordance with the above stated objects, below is described a novel and improved ditch digging and filling implement which includes a tow bar attached to a conventional tractor and supported by a swing axle connecting the wheels of the implement comprising this invention. The tow bar dependingly supports a plow member at its rear portion and further has two diverging rearwardly and upwardly extending arms which are attached to the tow bar at a common point. Each of the arms supports a concave plate which is rotatably mounted relative to the arm and is capable of assuming either of two positions. The first position assumed faces the concave plate adjacent the plow member so as to form an extension of the plow member for more efficient digging. A second position of the concave plates allows the plates to push a mound of dirt formed on either side of the ditch back into the ditch.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an elevational front view of the invention in its ditch digging position;

FIGURE 4 is a top plan view of the invention in its filling position;

FIGURE 5 is a front view of the invention in its filling position;

FIGURE 6 is a sectional view taken substantially along the plane 6—6 of FIGURE 5.

Figure 1:
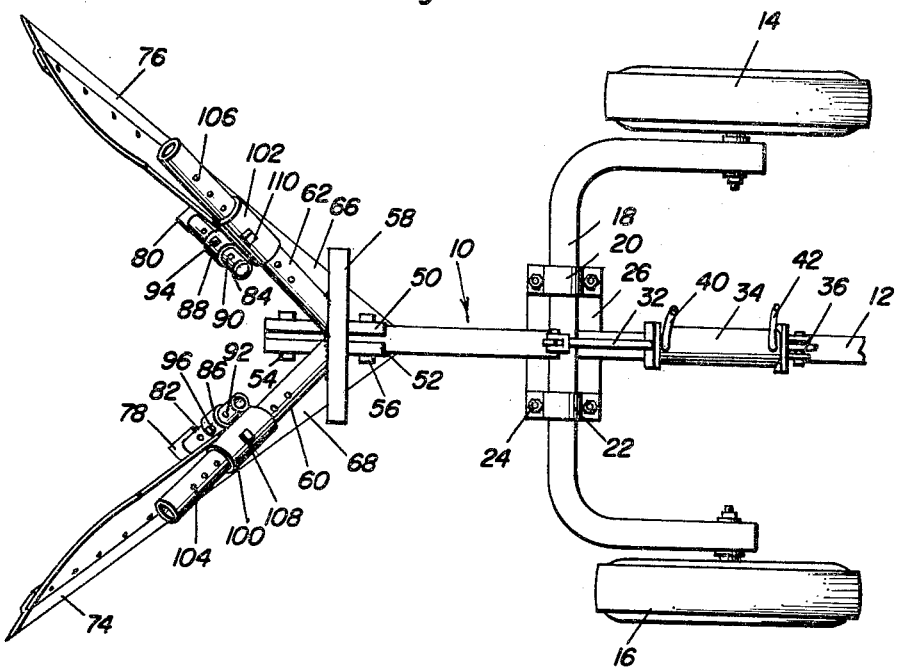
FIGURE 1 is a top plan view of the implement comprising this invention with the concave plates in the ditch digging position.

With continuing reference to the drawings the numeral 10 generally presents the implement comprising this invention and adapted to be conventionally attached to a conventional tractor by a tow bar 12 for movement on rotatably mounted wheels 14 and 16. The wheels 14 and 16 are connected by a swing axle 18 which is U-shaped and rotatably supports the wheels 14 and 16 at the ends of the leg portions of the U-shape. The axle 18 has apertures which accommodate shafts which enable the swing axle 18 to swing or pivot about the rotational axis of the wheels 14 and 16. The swing axle 18 has a pair of U-shaped clamps 20 and 22 attached thereon as by bolts 24. The U-shaped clamps 20 and 22 support a plate 26 which is fixed to the tow bar as by welding. The swing axle 18 has a lever arm 28 fixedly attached to the bight portion thereof. The lever arm 28 is connected by a pin and slot connection 30 to a piston rod 32 of a hydraulic cylinder 34. The hydraulic cylinder 34 is in turn pivotally connected as at 36 to an ear 38 which is welded to the tow bar 12. The hydraulic cylinder 34 may be actuated through cables or conduits 40 and 42 for longitudinally moving the piston 32. Initially, assuming the tow bar 12 is in the solid line position shown in FIGURE 2, the withdrawal of piston 32 within cylinder 34 by proper operation of cables or conduits 40 and 42 will cause the lever arm 28 to tend to swing or pivot the swing axle 18 about a shaft 44. As the swing axle tends to swing about shaft 44, it of course will carry the tow bar 12 therealong due to the clamp connection as at 20 and 22. The upward movement of the tow bar will of course force the pivotal connection 36 upwardly and result in a continual movement of swing axle 18 about shaft 44 as long as piston rod 32 continues to withdraw into cylinder 34. Ultimately, the tow bar 12 and swing axle 18 will assume the dotted line position shown in FIGURE 2.

The tow bar 12 is enclosed in a pair of jaw clamps 50 and 52. The jaw clamps 50 and 52 and the tow bar 12 have aligned apertures therethrough for the accommodation of nuts and bolts 54 and 56. Welded to the jaw clamps 50 and 52 is a transverse member 58 which has a pair of diverging rearwardly and upwardly extending arms 60 and 62 welded thereto. Dependingly supported from the jaw clamps 50 and 52, as by welding, is a plow member 64 which includes two wedge shaped faces 66 and 68. The faces 66 and 68 form concave surfaces and the wedge or vertex angle formed by the concave surfaces is also concave as indicated at 70. The bottom surface of the faces 66 and 68 is rearwardly and upwardly inclined as at 72 so that the composite plow member structure clearly forms a device for digging a path in the ground as the plow member is passed through the ground.

Each of the rearwardly extending and inclined arms 62 and 60 dependingly support concave plates 74 and 76. Each of the plates 74 and 76 has a fixed lug as at 78 and 80 on the back surface thereof which is fixedly attached to a shaft 82 or 84. The shafts 82 and 84 are in turn slidably and rotatably carried in collars 86 and 88. The shafts 82 and 84 have a series of apertures as at 90 and 92 for accommodating bolts 94 and 96 which pass through the collars 86 and 88 and are accommodated in the shaft apertures. The collars 86 and 88 are in turn welded to collars 100 and 102 which are slidably accommodated on arms 60 and 62. The arms 60 and 62 likewise have apertures 104 and 106 which accommodate bolts 108 and 110 passing through the collars 100 and 102.

In the operation and utilization of this device, when a ditch is desired to be dug, the collars 100 and 102 are moved to a point close to the common point between the arms 60 and 62 adjacent the plow member 64. Further, the shafts 82 and 84 are rotated in the collars 86 and 88 to the position shown in FIGURES 1, 2 and 3. That is, the shafts are rotated so that the concave plates 74 and 76 virtually form an extension of the faces 68 and 66 respectively of the plow member. The plow member 64 and plates 74 and 76 therefore form a unitary rearwardly extending inclined surface for penetration of the ground as clearly shown in FIGURE 2. The concave surface 70 digs through the ground and the dirt is moved to the side along the plate surfaces 68 and 74. Each of the plow member faces 66 and 68 have rear ledges as at 120 welded thereto to form a stop for the plate 74 which is pivotable about the shaft 82.

Figure 2:
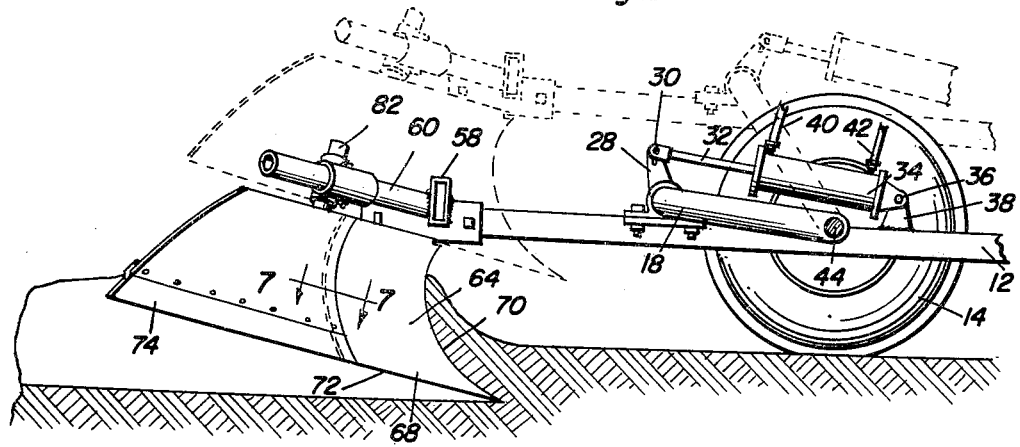
FIGURE 2 is an elevational side view of the implement in its ditch digging position.
Figure 7:
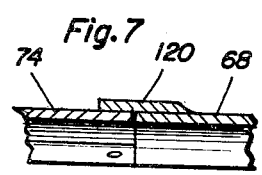
FIGURE 7 is a sectional view taken substantially along the plane 7—7 of FIGURE 2.

FIGURES 1, 2 and 3 show the implement comprising this invention utilized to dig a ditch. If it is desired to fill the ditch, the device is utilized as is shown in FIGURES 4 and 5. That is, the collars 100 and 102 are moved outwardly along arms 60 and 62 by removing and replacing nut and bolt combinations 108 and 110. Likewise, bolts 94 and 96 maintaining shafts 82 and 84 in place are removed and the shafts 82 and 84 are each rotated 90° from the position shown in FIGURE 1 so they assume the position shown in FIGURE 4. That is, the concave plate 74 will be rotated 90° counterclockwise about the shaft 82. The concave plate 76 will be rotated 90° clockwise about the shaft 84. The concave plates will then assume the position as shown in FIGURE 4 and FIGURE 5 with their forward and outer edges touching the ground and forcing mounds of dirt on either side of the ditch toward the ditch along their concave surfaces.

In summary, therefore, what has been disclosed is an implement which can be selectively utilized to either dig a ditch when the device is arranged as is shown in FIGURES 1 through 3 or to fill a ditch when the device is converted to the condition illustrated in FIGURES 4 and 5. The conversion from the one selected position to the second selected position is achieved by simply moving collars 100 and 102 outwardly along the rearwardly inclined arms 60 and 62 and by rotating the shafts 82 and 84 which are fixed to the concave plates 74 and 76 90° relative to collars 86 and 88.

It is also pointed out that the blades or plates 74 and 76 have a large degree of versatility when in their covering positions. The positions of these blades with respect to the ditch which is being covered may be varied by sliding the collars 100 and 102 along the arms 60 and 62. The arms 60 and 62 are provided with a plurality of apertures 104 and 106 which accommodate the bolts 108 and 110 carried by the collars 100 and 102. Thus the covering blades 74 and 76 may be selectively positioned along the arms 60 and 62.

Furthermore, the shafts 82 and 84 are provided with a plurality of apertures 90 and 92 which receive bolts 94 and 96 carried by the collars 86 and 88. The provision of the numerous apertures 90 and 92 permit the covering blades 74 and 76 to be vertically adjusted. By so vertically adjusting the covering blades 74 and 76, the amount of cut made by the blades may be varied. Thus a small tractor under adverse conditions, such as extremely wet soil, may still pull the invention. On the other hand, under ideal conditions the larger tractor may obtain a full cut by lowering the covering blades 74 and 76.

Although several uses of the invention have been set forth hereinbefore and other uses of the invention will become apparent to an owner of the invention, a very desirable use of the invention is as a bordering machine in flood-type irrigation. The machine can be used to throw up a mound of dirt around the outside of a field so that the entire field can be flooded as is done in irrigating some types of farm crops, for example, rice.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A ditch digging and filling device adapted to be propelled by power means comprising a tow bar connected to and extending forwardly from a V-shaped frame in a direction in which said device is adapted to be propelled, said V-shaped frame comprising a pair of cantilevered arms rigidly connected together and to said tow bar at their forward ends and diverging in a rearward direction, a V-shaped plow rigidly connected to and in alignment with the apex of said V-shaped frame, blade, means carried by each of said arms adjacent the outer ends of said plow for selectively digging or filling a ditch and having surfaces normally in alignment with surfaces on said plow for digging a ditch, a generally vertical shaft fixed to each of said blade means, connecting means pivotally and slidably connecting each of said blade means to a separate one of said arms, each of said connecting means comprising a member coaxial with and slidably guided on one of said arms, a sleeve secured to said member and slidably and rotatably receiving one of said shafts, first locking means for securing said member in preselected positions on its respective arm, and second locking means for securing said sleeve to its respective shaft in preselected angular and vertical positions.

2. A device as defined in claim 1 wherein said arms are of constant cross section throughout their lengths and each of said members encomposses one of said arms so as to slide therealong and off the free end thereof when released by said first locking means.

3. A device as defined in claim 2 wherein said arms slope upwardly from said tow bar.

4. A device as defined in claim 3 wherein said shafts and sleeves slope downwardly, outwardly and rearwardly.

5. A device as defined in claim 4 wherein said plow has abutment means on its outer ends arranged to extend behind and overlap said blade means when the blade means are aligned with said plow.

References Cited in the file of this patent

UNITED STATES PATENTS

| 101,729 | Harmon | April 12, 1870 |
| 310,974 | Baker | Jan. 20, 1885 |
| 494,993 | Tomlin | Apr. 4, 1893 |
| 1,303,813 | Brabandt | May 13, 1919 |
| 1,671,939 | Smith | May 29, 1928 |
| 1,910,299 | Lessig | May 23, 1933 |
| 2,424,014 | Bobeldyk | July 15, 1947 |
| 2,648,919 | Brown | Aug. 18, 1953 |
| 2,695,466 | Porter | Nov. 30, 1954 |
| 2,777,657 | Zent | Jan. 15, 1957 |
| 2,784,507 | Kinsinger | Mar. 12, 1957 |
| 2,849,809 | Chattin | July 15, 1958 |

FOREIGN PATENTS

| 20,844 | Sweden | Sept. 8, 1905 |
| 811,295 | Germany | Aug. 20, 1951 |
| 885,939 | Germany | Aug. 10, 1953 |
| 1,078,224 | France | Nov. 16, 1954 |

OTHER REFERENCES

Operator's Manual OM-K45-157; John Deere Killefer, ditcher No. 12, published by the John Deere Co., received Jan. 28, 1957.